(12) United States Patent
Beatson et al.

(10) Patent No.: US 6,960,022 B2
(45) Date of Patent: Nov. 1, 2005

(54) MACROCOMPOSITE GUIDEWAY AND GIB PRODUCED THEREFROM

(75) Inventors: David T. Beatson, Kennett Square, PA (US); E. Walter Frasch, Perkasie, PA (US); Paul J. Schlosser, Oreland, PA (US); Jai R. Singh, Trumbull, CT (US); David W. McKenna, Newark, DE (US); Craig Emmons, Monroe, CT (US)

(73) Assignee: Kulicke & Soffa Investments, Inc., Wilmington, DE (US)

( * ) Notice: Subject to any disclaimer, the term of this patent is extended or adjusted under 35 U.S.C. 154(b) by 0 days.

(21) Appl. No.: 10/616,708

(22) Filed: Jul. 10, 2003

(65) Prior Publication Data

US 2004/0131290 A1 Jul. 8, 2004

Related U.S. Application Data

(63) Continuation of application No. 10/289,166, filed on Nov. 6, 2002, now abandoned, which is a continuation of application No. 10/117,785, filed on Apr. 5, 2002, now abandoned, which is a continuation of application No. 09/940,847, filed on Aug. 27, 2001, now abandoned, which is a continuation-in-part of application No. 09/452,242, filed on Dec. 1, 1999, now abandoned.

(51) Int. Cl.⁷ .............................................. F16C 33/06
(52) U.S. Cl. ............................ 384/39; 384/47; 384/42
(58) Field of Search ........................... 384/42, 492, 43, 384/44, 45, 47, 49, 55, 39

(56) References Cited

U.S. PATENT DOCUMENTS

| | | |
|---|---|---|
| 2,050,960 A | 8/1936 | Olivetti |
| 3,709,573 A | 1/1973 | Orkin et al. |
| 3,711,171 A | 1/1973 | Orkin et al. |
| 3,873,168 A | 3/1975 | Viola et al. |
| 4,140,592 A | 2/1979 | Orlando ..................... 204/56 R |
| 4,427,241 A | 1/1984 | Jatczak |
| 4,469,489 A | 9/1984 | Sarin et al. .................... 51/295 |
| 4,477,009 A | 10/1984 | Walker ........................ 228/119 |

(Continued)

FOREIGN PATENT DOCUMENTS

| | | | |
|---|---|---|---|
| DE | 4 102 147 | 7/1992 | ........... B21K/25/00 |
| FR | 2 713 120 | 6/1995 | ............ B23Q/1/40 |
| JP | 07004433 | 1/1995 | ........... F16C/29/06 |
| JP | 07314197 A | 12/1995 | ........... B30B/15/04 |
| WO | WO 99/32678 | 7/1999 | ............. C22C/1/10 |

*Primary Examiner*—Lenard A. Footland
(74) *Attorney, Agent, or Firm*—Synnestvedt & Lechner LLP

(57) ABSTRACT

A "hybrid" or macrocomposite guideway, wherein the "traditional" or existing guideway material (e.g., hardened steel) is maintained as the wear resistant, low friction surface intended to be in physical contact with one or more bearings, and further wherein this surface is backed up or supported by a substrate comprising a stiff, lightweight material. This macrocomposite guideway combines the desirable friction and wear characteristics of the traditional bearing materials with the stiffness and low mass of advanced materials. Candidate substrate materials include composites having a ceramic and/or a metallic matrix, monolithic ceramics or monolithic light metals. A cladding comprising the hardened steel wear surface layer may be attached to the rigid, lightweight substrate by adhesive bonding, mechanical fasteners or other mechanical fit such as a friction or interference fit. Preferably, though, the attachment is by means of a metallurgical bond. In a particularly preferred embodiment, a silicon carbide particulate reinforced aluminum composite is metallurgically bonded to a tool steel wear surface using an "active" soldering composition. A gib that utilizes such guideways is useful in machines requiring fast and precise movement of one pat relative to another, such as in machines for semiconductor chip fabrication and assembly.

26 Claims, 8 Drawing Sheets

U.S. PATENT DOCUMENTS

| | | |
|---|---|---|
| 4,508,396 A | 4/1985 | Doi et al. .................... 384/463 |
| 4,576,421 A | 3/1986 | Teramachi |
| 4,706,352 A | 11/1987 | Furmanek et al. ..... 29/149.5 R |
| 4,934,202 A | 6/1990 | Hikita et al. ................ 74/89.15 |
| 4,934,835 A | 6/1990 | Albert ......................... 384/43 |
| 4,961,461 A | 10/1990 | Klier et al. ................. 164/461 |
| 5,040,588 A | 8/1991 | Newkirk et al. ............... 164/97 |
| 5,499,672 A | 3/1996 | Nakashima et al. ........ 164/418 |
| 5,553,945 A | 9/1996 | Blaurock et al. .............. 384/45 |
| 5,731,373 A | 3/1998 | Hirose et al. ............... 524/447 |
| 5,856,025 A | 1/1999 | White et al. ................. 428/614 |
| 5,964,535 A | 10/1999 | Feinstein et al. .............. 384/44 |
| 6,009,957 A | 1/2000 | Esko et al. .................... 173/4 |

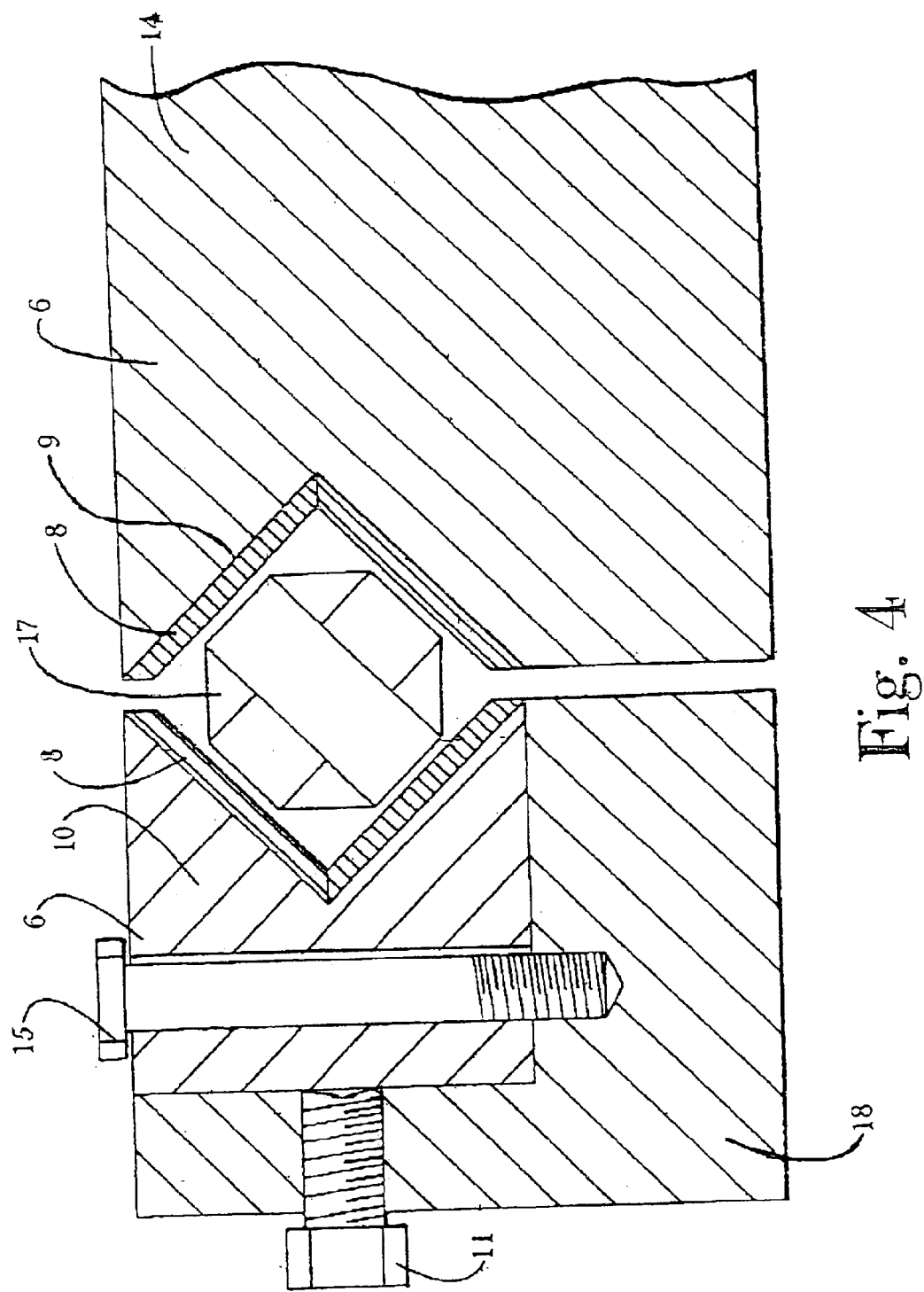

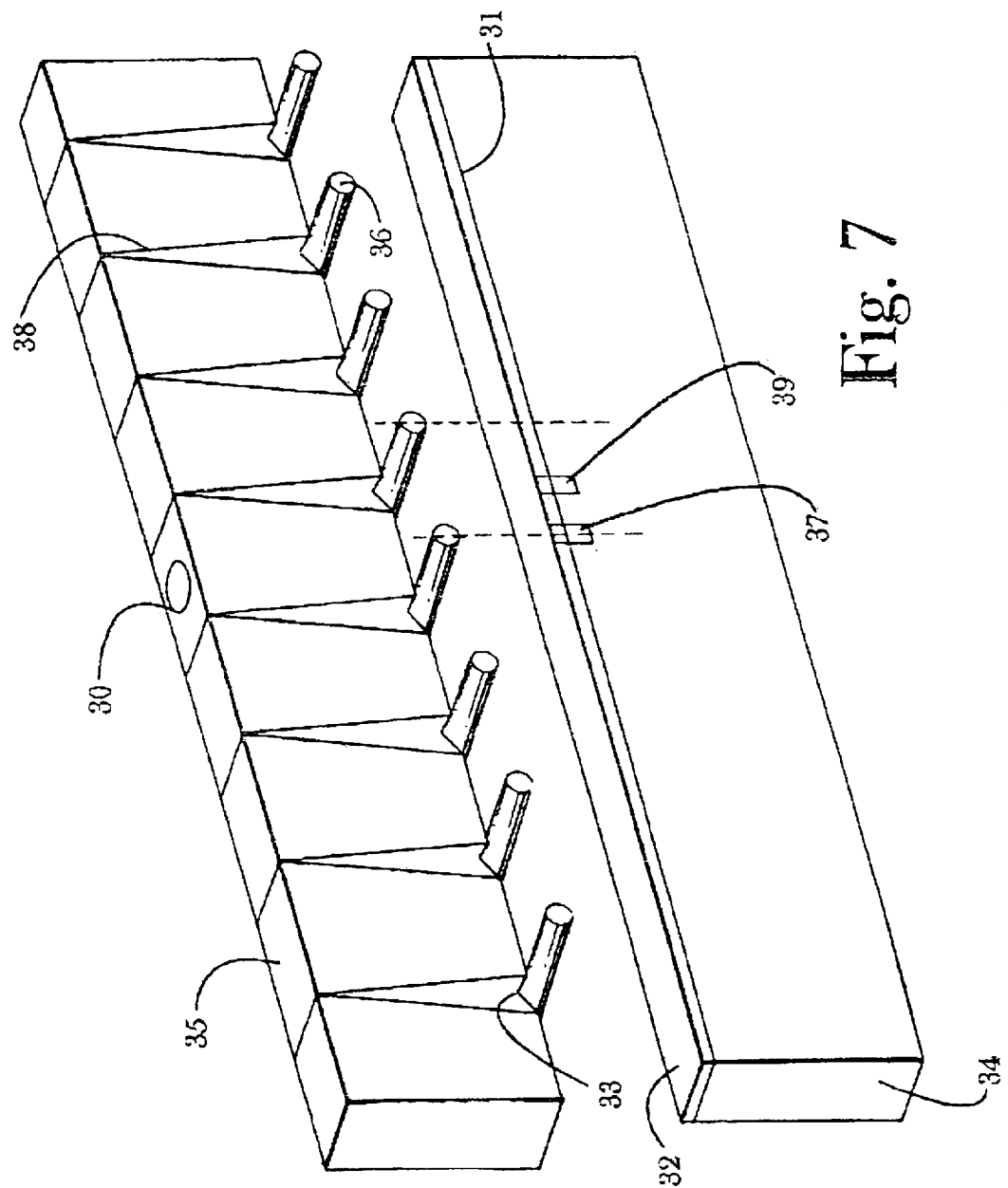

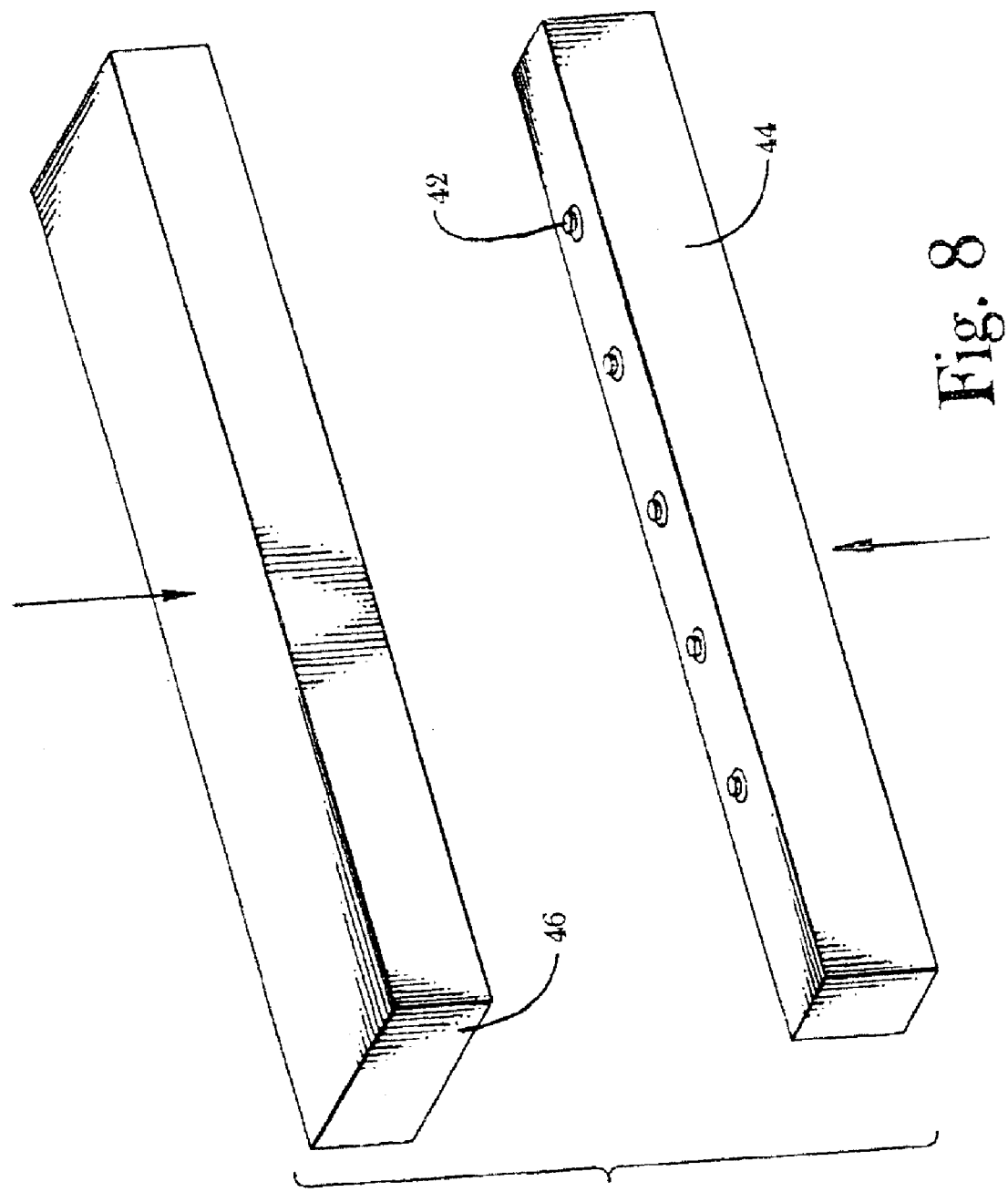

US 6,960,022 B2

MACROCOMPOSITE GUIDEWAY AND GIB PRODUCED THEREFROM

CROSS-REFERENCE TO RELATED APPLICATIONS

This patent document is a Continuation of U.S. patent application Ser. No. 10/289,166, filed on Nov. 6, 2002, now abandoned which was a Continuation of U.S. patent application Ser. No. 10/117,785, filed on Apr. 5, 2002 (and now abandoned), which was a Continuation of U.S. patent application Ser. No. 09/940,847, filed on Aug. 27, 2001 (and now abandoned), which was a Continuation-in-Part of U.S. patent application Ser. No. 09/452,242, filed on Dec. 1, 1999 (and now abandoned), the entire disclosures of each of which are incorporated herein by reference.

BACKGROUND OF THE INVENTION

1. Field of the Invention

The instant invention relates to gibs for low friction, linear motion of one structure of a machine with respect to another. More specifically, the invention relates to lightweighting of the linear guideway portion of the gib for use in high acceleration applications such as in semiconductor fabrication.

2. Description of the Related Art

Bearings are used in machines to provide low friction, uniform motion of one or more components relative to one or more other components. Bearings can be categorized as "contact" or "non-contact". The latter category includes the gas bearings and those bearings that rely upon the maintenance of a hydrodynamic film for their operation. Contact bearings, on the other hand, feature an actual physical contact between the components that move with respect to one another. Slide bearings specifically provide for low friction linear motion, and are sometimes referred to as "linear bearings".

Gibs are machine elements associated with slide bearings of the contact type that help to ensure a high degree of precision and control in this linear motion. Such precise control of movement or position is required in operations such as machining or semiconductor fabrication. In the literature, the term, "gib" sometimes refers only to a tapered beam that can be pressed against a slide or linear bearing assembly to take the slack or "play" out of the latter, which can arise due to wear in the bearings, guides or ways. In the context of the instant invention, however, "gib" may still include this function, but primarily refers to the entire collection of parts that is responsible for the low-friction, high-precision straight-line motion of one piece of a machine relative to another piece. Typically, a plurality of gibs is required in each machine, as motion usually must be controlled in more than one dimension or degree of freedom. In addition, machines often require more than one gib per travel dimension.

Gibs come in a number of varieties. Some forms feature low friction polymers such as polytetrafluoroethylene (PTFE) at the contact surface. Other versions have ball bearings or roller bearings sandwiched between two (or more) hard, flat surfaces. The surfaces often function as housings or tracks for the bearings, with one of the housing halves attached to, for example, the base of the machine, and the other housing half attached to the table, stage or surface that is to be in motion relative to the base. The hard bearing housings (hereinafter referred to as "guides" or "guideways") are typically made from tool steel.

In certain applications, such as CNC machining or semiconductor wirebonding, the faster the workpiece can be moved, the more productive is the machine. Moving the workpiece about implies that it is to accelerated/decelerated, and the magnitude of such accelerations is governed by F=m a, "force equals mass times acceleration." The applied force correlates with the power of the motor driving the movable stage on which the workpiece is mounted. For a driving motor of given power, the speed to which the workpiece can be accelerated is inversely proportional to the mass to be accelerated. Thus, greater speeds and therefore greater manufacturing efficiencies can be realized by reducing the mass to be moved. Considerable progress has been made in reducing the mass of the stage or table in machines that fabricate and package integrated circuits or "IC's". Lightweight materials such as aluminum or composites have replaced traditional but heavy steels and cast irons where possible. Accordingly, in an IC wirebonding machine, for example, the stage supporting the semiconductor "chip" to be wire bonded may have a mass of only a few kilograms. Until now, however, not much effort has been expended in reducing the mass of the gibs that make possible the low friction x-y motion of the stage. Thus, the gibs may make up a significant fraction of the total mass of the stage.

U.S. Pat. No. 3,953,086 to Chaffin discloses a tapered gib for machine tools that is composed entirely of a plastic material such as an acetal resin containing uniformly dispersed, finely divided particles of polytetrafluoroethylene to provide reduced friction. The surface of the gib that is in contact with the table features raised portions such as nibs, ridges, etc. The gib may be operated without lubrication and wears in preference to the metal components with which it is in sliding contact. Thus, elimination of the wear-induced "play" involved replacement of the gib, rather than replacement of the metal components contacting the gib, such as the table. This gib, however, possesses frictional resistance greater than that of a roller or ball type bearing, and the inventors highlight the fact that the friction is sufficiently high to be able to locate the table of a machine tool with a static friction lock. It would seem that in an application where the table must move at high speeds, such as in a wirebonding application, a gib having less friction would be preferable.

U.S. Pat. No. 5,096,348 to Winkler et al. discloses a machine tool guide comprising plastic sliding pads placed at the sliding surface of the tool guide. This transition from metal/metal contact to metal/plastic contact has a natural self-damping effect with respect to any vibrations that may be generated such as, for example, by a machining operation. Channels are provided in the plastic pads for introduction of a lubricant such as oil so that the frictional forces that are encountered may be minimized.

It seems that many of the plastic based bearings require additional lubricants to further reduce their coefficients of friction.

U.S. Pat. No. 4,877,813 to Jinno et al. discloses a composition for a so-called "plastic bearing" that is intended to function as a lightweight form of a metal bearing. The improvement comprising the addition of short, unentangled fibers of an aromatic polyamide to a thermoplastic resin (i) to improve the load capacity of the bearing compared to non-fiber-containing compositions, and (ii) to improve (lower) the friction coefficient compared to compositions employing conventional fibers such as glass or carbon. Although the inventors claimed that the bearing could operate dry, the coefficient of friction still was appreciable in this condition (about 0.34 to 0.36), but was improved considerably with additions of lubricating oil up to about 10 percent by weight.

In some applications, the requirement for oil lubrication poses a potential contamination issue. For example, U.S. Pat. No. 5,909,705 to Short et al. discloses a novel gib mount assembly comprising a squeeze seal oil film between the bearing surface of the gib mount and the adjoining slide used to control the clearance between the same. One or more vacuum regions are created about the boundaries of the oil film to suction and capture any oil escaping from the oil film region, thereby preventing contact of oil with the parts being processed by the machine (here, in a pressing or stamping operation).

Thus, efforts to produce lightweight gibs have focused on introducing polymeric materials or composites thereof into the sliding contact portions of the gib. In general, these gibs generate more friction than do their steel counterparts. For low friction applications, lubricants may have to be added, which is inconvenient and may pose contamination problems for workpieces that must be kept clean. Also, the polymers have much lower elastic moduli than steels, and accordingly undergo greater distortion than do steels for a given load. This property would seem to be at odds with current trends in semiconductor fabrication in which higher modulus materials such as metal or ceramic composites are being introduced to reduce the distortion under load and thereby achieve greater precision in motion control. Thus, it seems that the desired lightweight gibs should not rely on low modulus materials.

Many reinforced metals, or metal matrix composite ("MMC") materials, possess a number of attractive attributes for a bearing/gib application, specifically low specific gravity compared to steels, and high elastic modulus. Many of these MMC's are reinforced with ceramic materials, and accordingly are quite wear resistant in dynamic contact with metals. One general problem with using MMC's as bearing materials is the lack of knowledge or experience in engineering or refining the material for this type of application. For example, many of these MMC's, particularly those employing silicon carbide as reinforcement, are simply too abrasive of the steel ball or roller bearing materials in which they are in contact.

Accordingly, other investigators have experimented with depositing various hard, high modulus coatings onto MMC surfaces in an effort to render the surface amenable to the high stress contact of a rolling-type bearing. The instant inventors are not aware of any such work that yielded a successful bearing-compatible surface. For example, while it is possible to plasma spray tool steel, such material plasma sprayed onto MMC turns out to be too porous to function properly as a guideway for a bearing in rolling contact.

The prior art steel guideways against which the hardened steel bearings run have excellent low friction and wear resistance properties. Further, a large experience base exists for steels, including those grades suitable for bearing applications. The problem with steel is its mass; specifically, tool steel may have almost three times the mass of a reinforced aluminum composite component of the same volume. What is needed is a gib that retains the beneficial properties of tool steel, such as low friction and wear resistance, but features the low specific gravity and high modulus of more advanced materials, such as composites.

SUMMARY OF THE INVENTION

Thus, it is an object of the instant invention to preserve the desirable attributes of the existing steel sliding bearing assemblies, namely high elastic modulus and low coefficient of friction, while substantially reducing mass to permit greater accelerations and speeds.

It is an object of the instant invention to provide a simple and reliable technique for joining the hardened steel bearing surface to the underlying lightweight support.

It is an object of the instant invention to produce a macrocomposite linear guideway wherein the bearing surface material and the underlying substrate material are reasonably matched to one another in terms of thermal expansion coefficient.

The instant invention accomplishes these and other objectives by substituting a portion of an existing hardened steel linear guideway with a material having high elastic modulus but low mass relative to the substituted material. In particular, a "hybrid" or "macrocomposite" guideway is produced, whereby the steel guideway material is maintained as the wear resistant, low friction (albeit heavy) surface intended to be in contact with one or more bearings, and this surface is backed up or supported by a rigid but lightweight substrate. Viewed in the alternative, the instant macrocomposite guideway comprises a rigid, lightweights substrate clad with a hardened steel layer. Candidate substrate materials include composites having a ceramic and/or a metallic matrix, monolithic ceramics and monolithic light metals. The substrate may be attached to the steel wear surface by adhesive bonding, mechanical fasteners or other mechanical fit such as a friction or interference fit. Preferably, though, the substrate is attached by means of a metallurgical bond, such as by welding, but even more preferably by brazing or soldering. In a particularly preferred embodiment, a silicon carbide particulate reinforced aluminum composite is metallurgically bonded to a tool steel wear surface using an "active" soldering composition.

In another aspect of the invention, instead of a separate, discrete linear macrocomposite guideway being produced, the macrocomposite guideway is integrated into some desired machine, specifically into that component of the machine that supports and moves the workpiece.

One application for the present macrocomposite guideway is for a stage or carriage for wirebonding microprocessor chips. Here, the substrate may be an integral part of the chassis of the stage, or it may be entirely separate, with the resulting macrocomposite guideway subsequently being fastened to the stage.

Definitions

"Gib", as used herein, means an assemblage of linear guideway(s) and bearing element(s) and all parts necessary to accomplish low friction linear motion.

"Bearing assembly" or "Roller bearing assembly", as used herein, refers to the collection of bearing elements or bearing bodies and any supporting structure that fits into the bearing race such that the bearing elements or bodies contact the linear guideways.

"Bearing race", as used herein, refers to the space defined by the linear guideways into which the bearing assembly is placed to form a gib.

"Lightweight body" or "Lightweight material", as used herein, means a body or material having or engineered to have a bulk density less than about 60 percent that of hardened steel. Thus, "lightweight material" in the context of the instant disclosure not only includes materials having a low theoretical density such as aluminum, silicon, magnesium, beryllium and titanium, but also includes materials specifically processed to meet the above criterion. An example of such an engineered material would be a steel having more than 40 percent porosity, e.g., a foamed steel.

"Linear guideway", as used herein, refers to the article or machine element that houses the bearing element(s) and against which the bearing moves.

"Macrocomposite", as used herein, means a unitary article made of at least two materials that differ in at least one important property and which are not distributed uniformly or regularly throughout the article. Here, "unitary" means that the materials are joined to one another with the intent that the bond be permanent. Thus, in the context of the instant disclosure, a macrocomposite does not require any constituent material to be a "composite" material according to the common meaning and usage of the term.

BRIEF DESCRIPTION OF THE FIGURES

FIG. 4 is similar to FIG. 1 except that one of the macrocomposite guideways is integrated or built in to the movable chassis or stage of the machine;

FIG. 7 is an isometric view of a jig used in a fatigue test to apply eight compressive loads simultaneously to a macrocomposite guideway; and FIG. 8 is an isometric view of a jig used to simulate the pressure of a setscrew tightened against a MMC substrate portion of a macrocomposite guideway.

DETAILED DESCRIPTION OF THE INVENTION AND PREFERRED EMBODIMENTS

In accordance with the objectives of the instant invention, an existing bearing guideway made from an old material well known in the art is replaced in part with a material having high elastic modulus but low mass relative to the substituted material. In particular, a "hybrid" guideway is produced, whereby the "traditional" or existing guideway material is maintained as the wear resistant, low friction surface intended to be in contact with one or more bearings, and this surface is supported with a stiff yet lightweight substrate material. Thus, the new hybrid guideway comprises a macrocomposite material. The substrate may be attached to the steel wear surface by adhesive bonding, mechanical fasteners or other mechanical fit such as a friction or interference fit. More commonly, though, the substrate is attached by means of a metallurgical bond, such as by welding, but more commonly by brazing or soldering. In a preferred embodiment, a silicon carbide particulate reinforced aluminum composite is metallurgically bonded to a tool steel wear surface using an "active" soldering composition.

Figure 1:
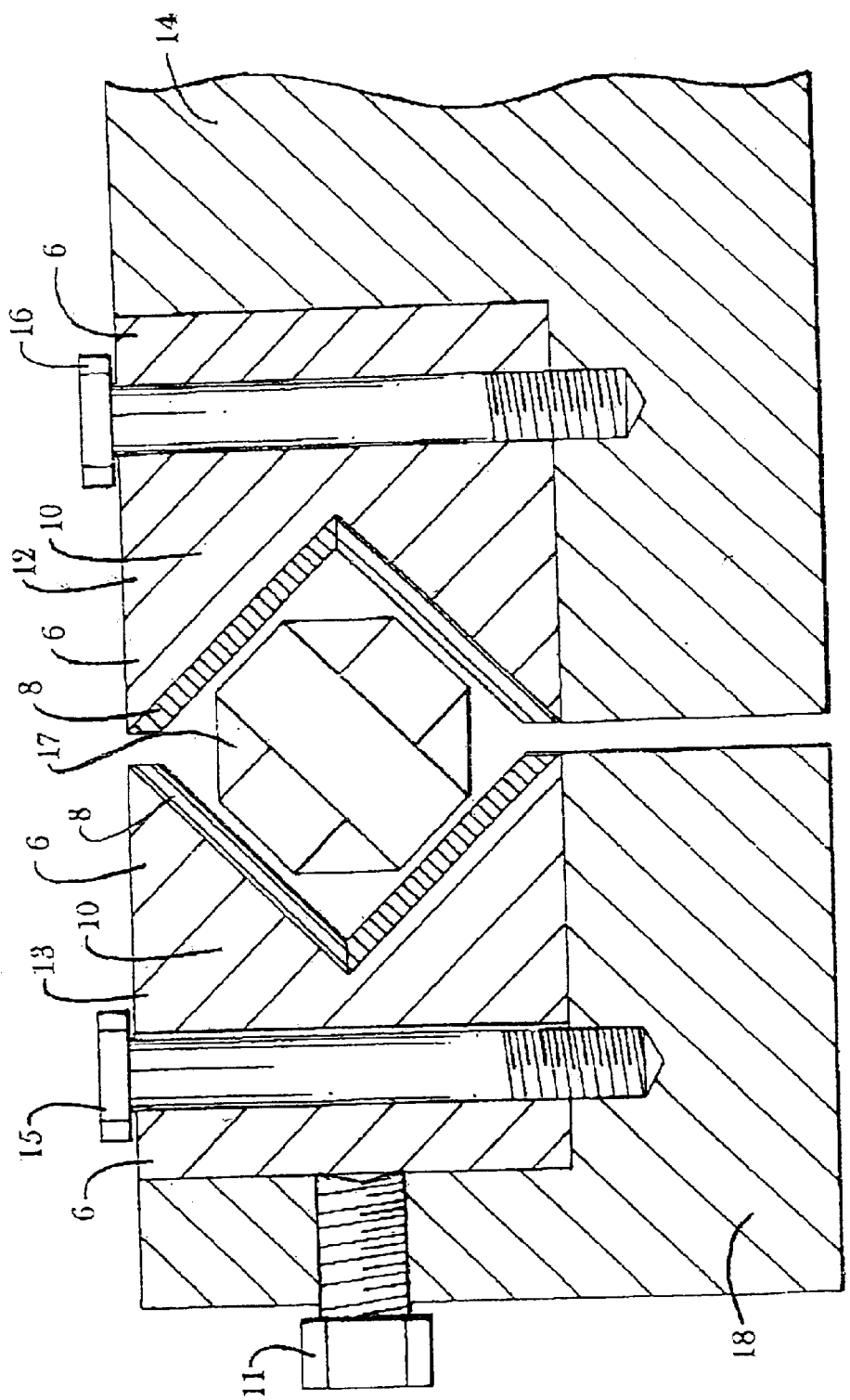
FIG. 1 is a cross-sectional schematic view of a macrocomposite gib according to the instant invention such as might be employed in a motion control application such as the movable stage of a semiconductor manufacturing machine.

Among the application areas for such a lightweight gib is in the field of semiconductor fabrication equipment, and in the motion control systems, e.g., the "stages" of integrated circuit or semiconductor "chip" wirebonding machines in particular. Referring to FIG. 1, a hybrid gib is employed in a motion control application as follows. One side or half 12 of the linear guideway 10 is attached to the moving portion 14 of the machine. This portion of the machine is the "stage" or "chassis" or "carriage", and supports the workpiece to be processed. In the figure, the means of attachment is by mechanical fasteners such as bolt 16, but the housing half could also be brazed or soldered to the stage. Next, the other half 13 of the guideway 10 is loosely attached to the non-moving portion 18 of the machine opposite the first guideway. Each linear guideway half comprises a tool steel surface 8 joined to a reinforced aluminum composite substrate 6. The stage is then placed onto the machine in the orientation that it will assume during service. The guideway loosely attached to the base of the machine is adjusted to permit the bearing assembly 17 to be inserted into the bearing race. The bearing race is the space defined by those tool steel surfaces that are to be in contact with the bearings. After inserting the bearing assembly into the race, the loosely attached guideway half is then adjusted by means of setscrews 11 to take out the slack between the bearings and the tool steel surfaces. The setscrews are then further tightened to apply a compressive force against the guideways and bearings, thereby "preloading" the bearings. The individual setscrews are then carefully adjusted so that the stage travels smoothly and without play along its intended range of motion. The loosely attached guideway half is then tightly clamped to the machine body, as for example, by means of bolt 15.

Figure 2:
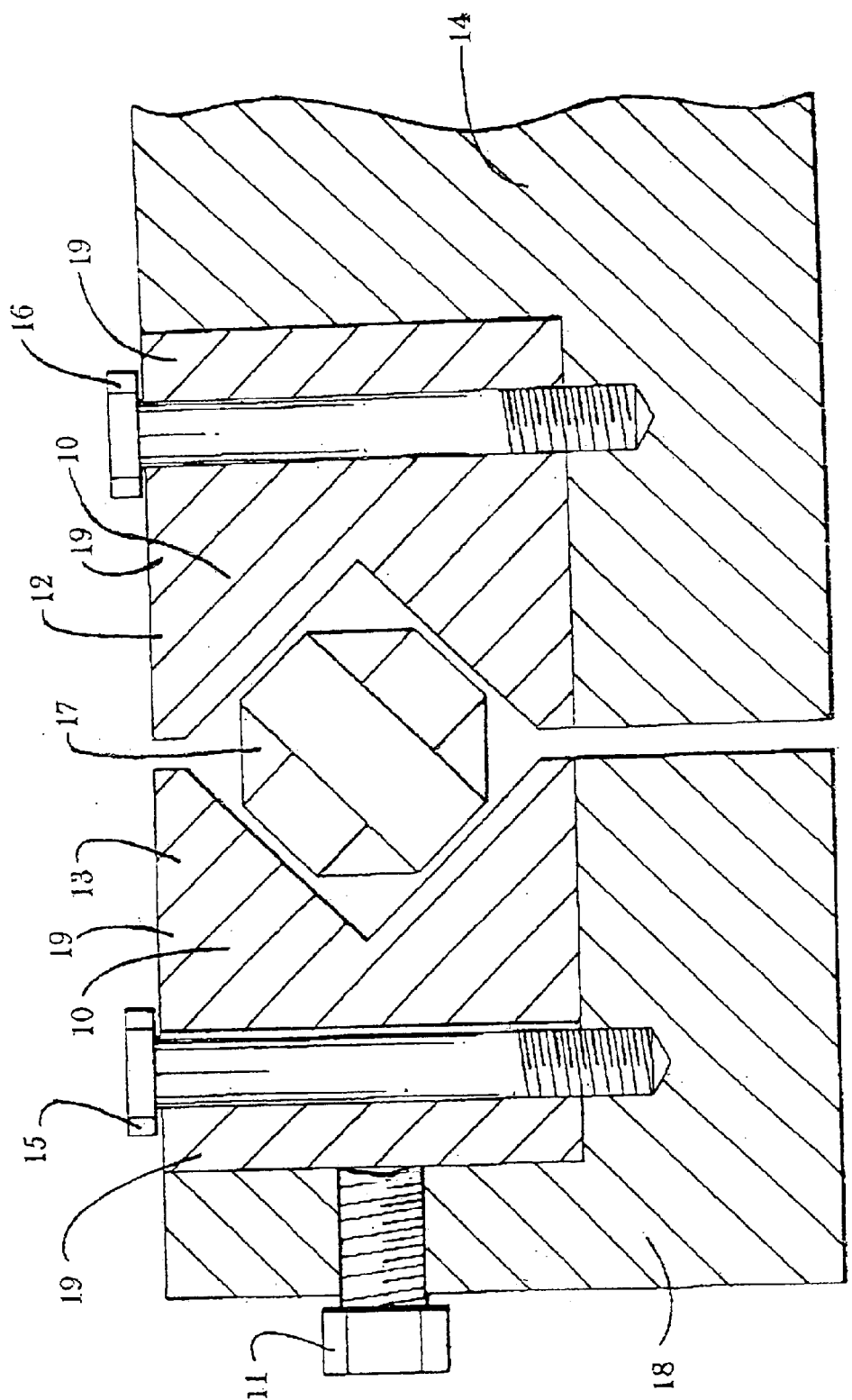
FIG. 2 is a cross-sectional schematic view of a prior art gib.
Figure 3:
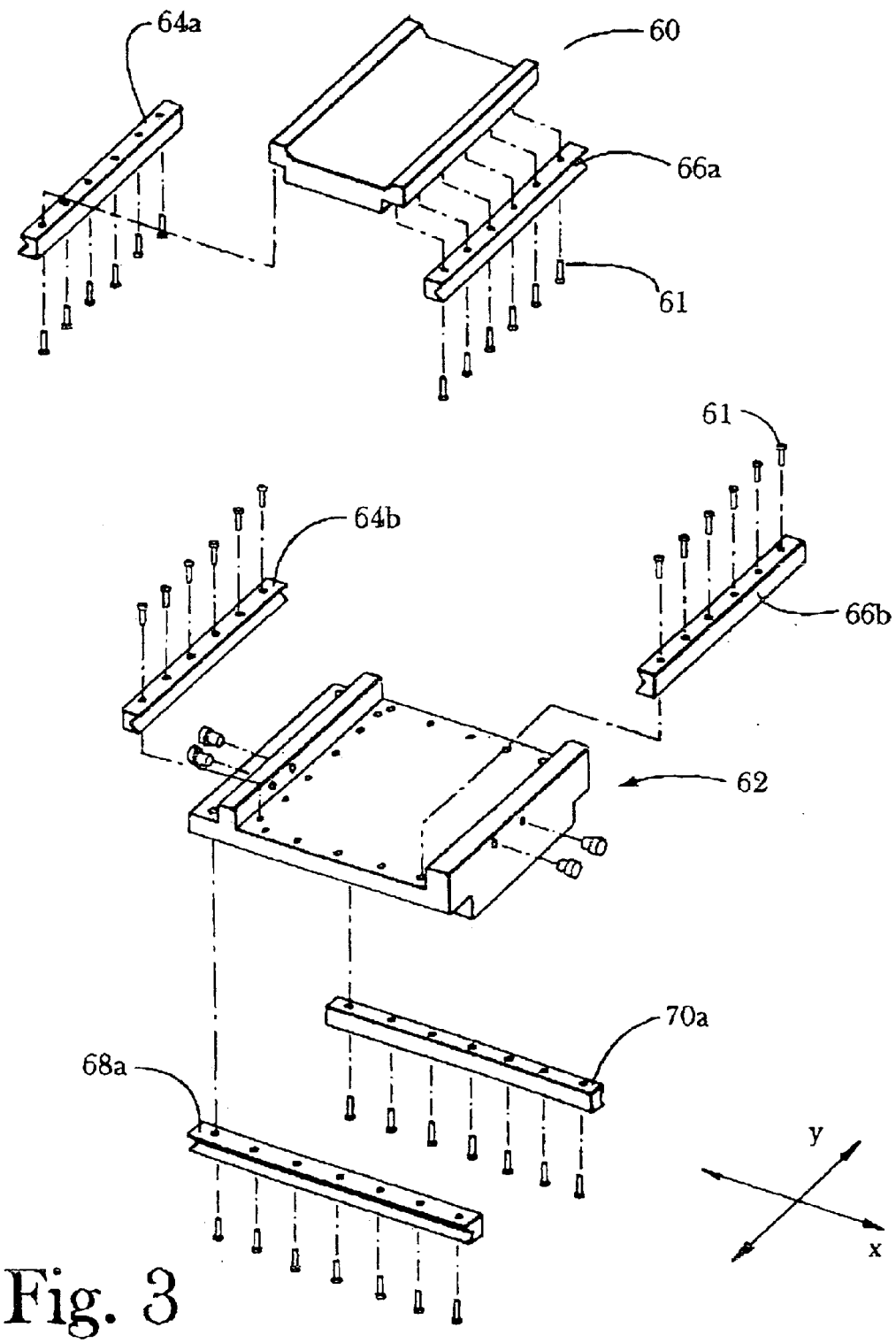
FIG. 3 is an isometric view of upper and lower stages of a motion control system of a machine showing how the stages move with respect to one another and with respect to the base of the machine to produce low friction motion within a defined region of a plane.

To assist the reader in understanding the nature of the invention, reference is made to FIG. 2, which represents the prior art. At first blush, FIG. 2 appears identical to FIG. 1. The critical difference, though, is that in FIG. 2, guideway 10 is not a macrocomposite, but instead is fashioned entirely from hardened steel 19. FIG. 3, also representative of the prior art, shows upper 60 and lower 62 stages of a motion control system in isometric view. This Figure in particular shows how the upper stage 60 attaches to the lower stage 62 through a pair of prior art gibs, with each guideway half 64a, 64b, 66a, 66b of each gib fastened by bolts 61 to one of the stages. The lower stage is similarly attached to the base of the machine (not shown) through a similar pair of prior art gibs and guideways 68a, 70a. This Figure also shows how the upper stage is responsible for linear motion in one direction, y, while the lower stage is responsible for motion in a direction orthogonal to that of the upper stage, x. Thus, a workpiece mounted on the upper stage is capable of being positioned at any point within a specific region of the plane defined by directions y and x.

In another aspect of the instant invention, the macrocomposite guideway is not a stand-alone piece, but instead is integrated into the chassis of a movable stage of some machine requiring highly precise motion control, such as a microprocessor wirebonding machine or a coordinate measuring machine, to name two examples. Here, the substrate of the macrocomposite guideway and the chassis of the wirebonding stage are made of the same lightweight, stiff material such as metal matrix composite material. Thus, the substrate does not have to be independently attached to the chassis, but can be integrated into the chassis design as a unitary piece. For example, the chassis may be cast to a shape that incorporates the guideway substrate shape. Lands or surfaces are specifically machined into the chassis to accommodate the piece(s) of hardened steel, which forms the bearing surface. The steel bearing surface is attached to the land of the chassis by any suitable means.

FIG. 4 illustrates this aspect of the instant invention in greater detail. Here, the guideway opposite to linear guideway 10 makes up an integral part of stage 14. More specifically, the aluminum composite substrate material 6 backing up and supporting the tool steel surface 8 is the same material as that which forms the chassis of stage 14. In one embodiment, an aluminum composite stage chassis is cast and includes surfaces or lands 9 onto which hardened steel surfaces 8 are brazed or soldered. Not only would such a design reduce the mass of the stage by an amount equal to the volume of substrate 6 (of liner guideway 10) times the density difference between hardened steel and cast aluminum composite material, but this design further reduces mass by eliminating the need for bolts 16 (see FIG. 1). In the prior art steel gibs, the steel bolts may not have added significantly to the total gib mass. With the instant lightweight materials, however, steel bolts represent significant mass—excess mass, in fact, that can be eliminated or significantly reduced with an alternative attachment means.

To accomplish the purposes of the low mass macrocomposite guideway, in addition to having low mass, the substrate material to be attached to the hard wear surface should possess high stiffness and reasonable strength. Not only must the guideway withstand the passive loads and dynamic accelerations during use without fracturing or plastically yielding, but also the guideway must not distort or deflect excessively.

A fairly large number of candidate materials potentially can fulfill these requirements, including monolithic ceramics, ceramic matrix composites and metal matrix composites. As the primary motivation for building the instant macrocomposite guideway is reducing the mass that must be accelerated/decelerated, as a rough approximation, it appears that the "lightweight" substrate material that is to displace some of the steel of the guideway should have a bulk density no greater than about 60 percent of that of the steel. More preferred is that the substituted substrate material has a mass no greater than about 50 percent that of the displaced steel material.

Somewhat along these same lines, what is most preferred is that the substrate material have a sufficiently high elastic modulus, such that the volume of substituting material does not have to be greater than what was removed in order to accomplish the same stiffness. What is acceptable is that the specific stiffness (e.g., ratio of elastic modulus to specific gravity) be at least 50 percent higher than that of the material being replaced.

A still significant number of materials fulfill these somewhat more stringent requirements, particularly those materials containing at least some ceramic component. Certain alloys of light metals also meet the requirements, such as aluminum-beryllium alloys; however, activities such as machining of these alloys that could create respirable dusts raise health concerns. Metal matrix composites, and especially those based upon aluminum or magnesium as the matrix, are attractive candidate substrate materials. Perhaps the largest experience base is with aluminum reinforced with 10 to 30 volume percent silicon carbide particulate. Not only do such MMC's meet the above stiffness and density criteria, but in general, they are also easier to machine than ceramics or ceramic matrix composites. Moreover, these composites can be formed into complex shapes, for example by casting. Accordingly, it is possible to fabricate entire motion control stages or chassis from such MMC's so that all that is necessary is to clad certain regions with the hardened steel that is to be the bearing surface.

During use in most precision equipment, the gib is not expected to experience temperature excursions much beyond ambient temperature, e.g., about 20° C. During fabrication, however, particularly during soldering of the substrate to the steel surface, the components to be joined may see temperatures of about 300° C. If the bonding comprises brazing or welding, however, the parts may be exposed to much higher temperatures.

Large residual stresses could be generated within the bonded bodies should the bodies have large differences in their respective coefficients of thermal expansion (CTE). Specifically, if a thermal expansion difference between the hardened steel member and the lightweight substrate member exists, then the thermally induced stress will increase in proportion to the degree of the mismatch, the extent of the temperature excursion and the size of the bonding region. These residual stresses could result in the warping of the hybrid guideway, particularly as the thickness or cross-section of the guideway is reduced, as for example during final machining. A beneficial feature of composite materials is the ability to tailor, at least to a degree, properties such as CTE. In particular, metal matrix composites such as silicon carbide reinforced aluminum can be engineered to have a CTE close to that of steels, thereby ameliorating this CTE-induced stress problem. Other composite materials such as reaction-bonded silicon carbide systems that feature a co-network of silicon carbide and silicon, and optionally comprising one or more filler materials, also may be CTE-adjustable, but such materials generally have CTE's that are substantially lower than those of steels.

The closer that the CTE's of hardened steel surface and lightweight substrate can be matched, the larger the guideway that can be produced for the same degree of CTE-induced stress that is generated. Even though the individual components on an integrated circuit chip are shrinking, the overall size of the silicon wafer from which such IC chips are produced are becoming larger, thus requiring ever-larger stages for the machines that manipulate silicon wafers. With properly matched CTE's, it is believed that guideways that are an appreciable fraction of one meter, or possible even one meter or more in length can be fabricated using the techniques disclosed in these pages. A lightweight macro-composite gib on the order of a meter in length would have a receptive market.

The number and ways in which a low mass, stiff substrate body may be attached to a steel wear resistant body is vast. In general, and to reduce complexity, permanent attachments such as adhesive or metallurgical bonding are more desirable than non-permanent attachment scenarios such as mechanical fasteners or mechanical interlocking mechanisms. Still further, because the substrate is expected to carry the bulk of the mechanical load, it is desirable that loads imposed upon the wear surface be transferred effectively to the substrate. Thus, the metallurgical type bonds are preferred over the adhesive bonding arrangements, their higher stiffnesses permitting more effective load transfer. Among the metallurgical bonds, however, welding may not be possible or practical. Specifically, the composition and/or properties of the thin layer of hardened steel may be adversely affected by the heat-affected zone of the weld. Moreover, and assuming that the substrate includes at least some metallic component, the metal of the substrate may be too different chemically from the steel such that the melting points are very far apart or the metals are not chemically compatible with one another. In view of these difficulties, brazing compositions have been developed for joining a wide variety of metals, ceramics and composites thereof. Still, if the substrate and wear surface materials are too different in terms of CTE, the residual stresses in the brazed hybrid may be excessive, leading to warping or other distortions, or leading to cracking or other delaminating at the bond zone.

What the instant inventors have found effective is a soldering composition that has been developed for metallurgically bonding traditionally "difficult" materials such as ceramics, aluminum and stainless steels. In this way, a 30 volume percent silicon carbide particulate reinforced aluminum composite has been bonded successfully to tool steel at a temperature less than 300° C. Moreover, the bonding can be conducted in air. This solder, known as "SuperBraze 250", available from Materials Resources International, North Wales, Pa. is based upon a traditional tin-silver composition, but it also contains some titanium as an "active" constituent to help chemically reduce surface oxides on the workpiece to be soldered. This solder also provides other desirable attributes such as a relatively low melting point typical of solders, as well as not needing special atmospheres protective of the solder or workpiece such as argon or vacuum atmospheres. Because the joining temperature is moderate, the need to match the CTE of the substrate to that of the wear resistant surface material is not quite so pressing. Accordingly, acceptable substrate materials for use with this solder include monolithic ceramics such as aluminum oxide or zirconium oxide, monolithic lightweight metals such as beryllium and alloys thereof, ceramic matrix composites such as reaction-bonded silicon carbide, as well as the above-mentioned metal matrix composites. Materials Resources International also produces other so-called "active" soldering compositions, many of which the inventors believe would work in the instant application area of cladding a stiff, lightweight substrate with hardened steel.

Figure 5A:
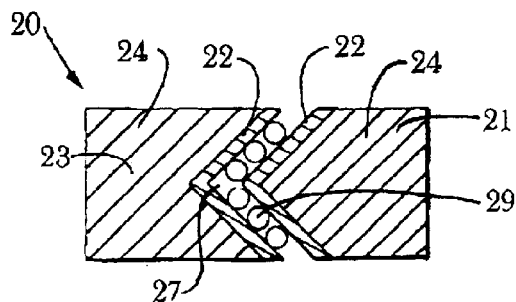
FIGS. 5A–5C show cross-sectional views of three gib geometries for accomplishing low friction linear motion.
Figure 5B:
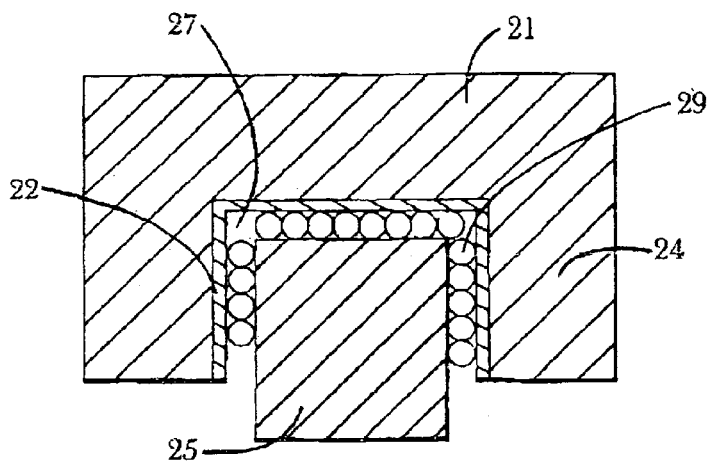
Figure 5C:
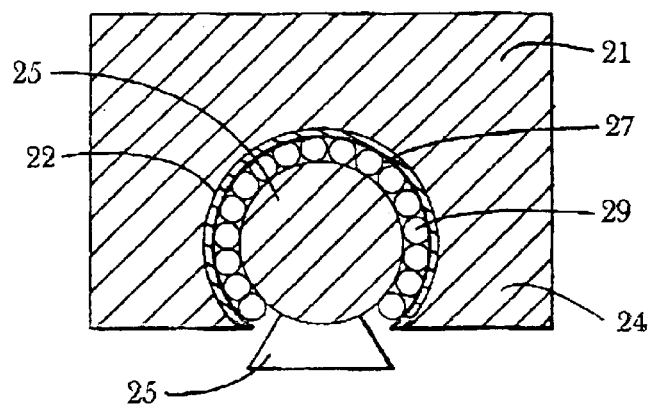

In FIGS. 1–4, the gib takes the form of opposing "V" shaped channels, with a bearing assembly located in the bearing race defined by the opposing channels. The instant invention is by no means limited to this particular geometry. FIGS. 5A–5C illustrate several different gib geometries (in cross-section) that may be employed in conjunction with the instant invention for providing high precision, low friction, linear motion. Components labeled with the same number perform a common or similar function. Here, forming or defining one of the two linear guideways making up an opposed pair is guideway half 21. This half of the gib 20 is intended to move as a consequence of its being attached to, or being a part of the movable chassis of the stage. Typically the chassis or stage features means for attaching the workpiece to the stage, such as a bolt or screw, but these are not shown in any of FIGS. 5A–5C. Movable linear guideway half 21 features hardened steel surface 22 supported by and bonded to lightweight substrate material 24. The opposing linear guideway 23, 25, together with the first, movable, linear guideway, defines the bearing race 27 into which alloy steel bearings 29 are disposed. Means for retaining the bearings in their respective races are not shown in these figures. Referring specifically to FIGS. 5B and 5C, linear guideway 25 is sometimes referred to as a "rail", and may make up, or be attached to a non-moving part of the machine. Accordingly, such a non-moving linear guideway may be fabricated from high specific gravity materials like hardened steels such as tool steel. In contrast, and specifically referring to FIG. 5A, linear guideway 23 is depicted as a thin body of hardened steel 22 for contact with steel bearings 29, but is backed up by lightweight material 24. Thus, linear guideway 23 itself may be part of, or be attached to some other component of the machine that is in motion. The situation illustrated by FIG. 5A is common in, for example, semiconductor wirebonding equipment, where typically the stage that supports the electronic chip to be wirebonded has at least two subunits, or chassis. A first chassis is responsible for linear motion in one direction, and a second chassis, mounted or otherwise attached to the first chassis, is responsible for linear motion in a direction substantially orthogonal to the direction of motion of the first chassis.

Although the instant inventors have focused on macro-composite linear guideways, the concept should extend to other bearing geometries. For example, it should be possible to make a macrocomposite guideway that is circular to accommodate a bearing that runs in a circular track for low friction rotational motion.

The instant invention will now be further described in terms of the following Examples.

EXAMPLE 1

Figure 6:
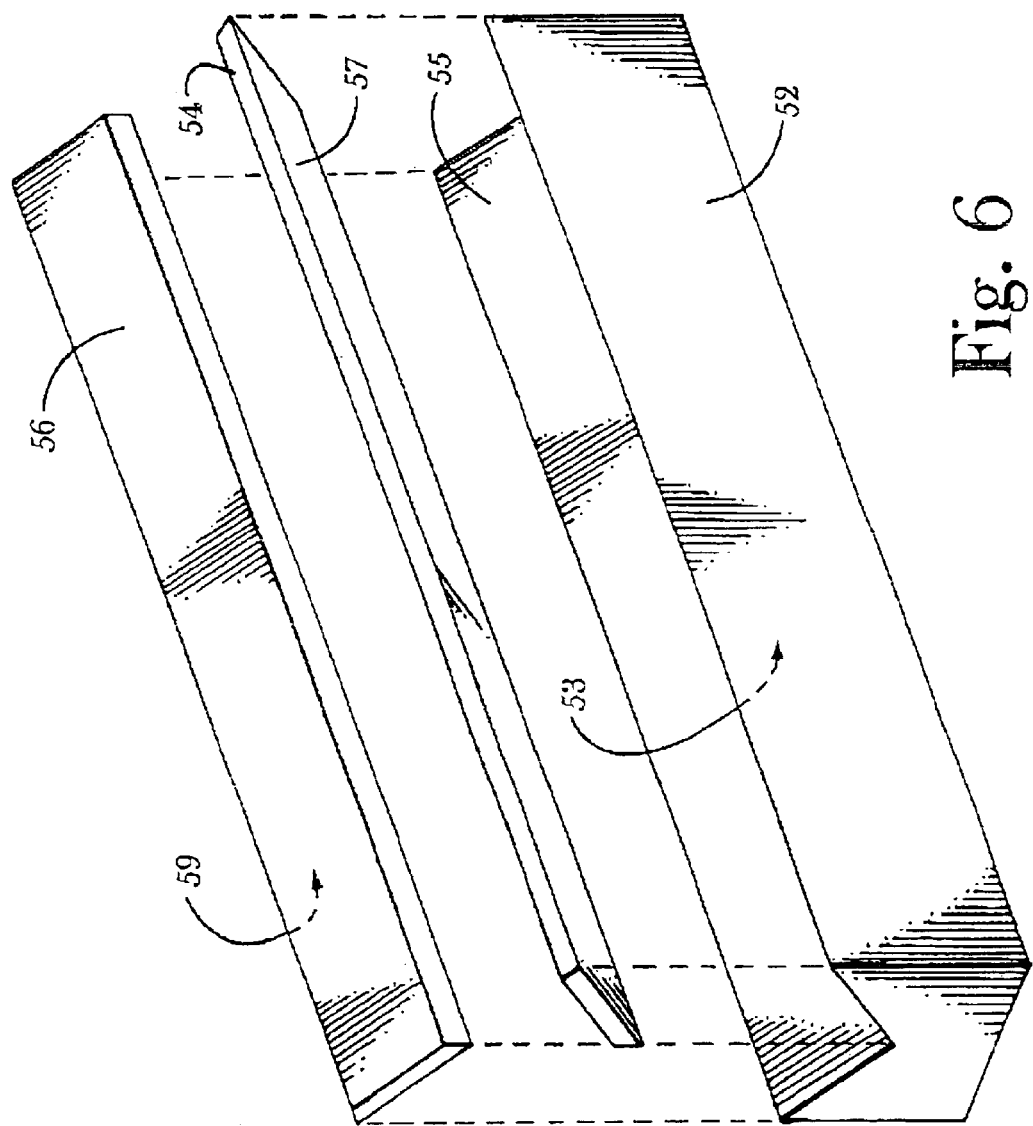
FIG. 6 is an isometric view in accordance with Example 1 that shows the construction of a macrocomposite guideway.

Referring to FIG. 6, a metal matrix composite substrate 52 having a "V" channel and measuring about 1 cm in cross-section and about 15 cm long was cut from a larger cast body. The MMC casting comprised by volume about 30 percent silicon carbide particulate and the balance a matrix metal comprising aluminum, silicon and magnesium (Grade ASC-301, M Cubed Technologies, Inc., Monroe, Conn.).

Two strips 54, 56 of 13 mm wide, 16 gage (about 1.6 mm thick) Grade D2 tool steel each measuring about 16 cm long were beveled so that they could be fitted together at a right angle as shown in the Figure. The MMC substrate and the tool steel strips were machined to the approximate final dimensions. The strips were then heat treated as follows: heating straightaway to about 790° C., after maintaining a temperature of about 790° C. for about 1 hour, heating to about 960° C. at a rate of about 2° C. per minute, after maintaining a temperature of about 960° C. for about 15 minutes, removing the strips from the furnace and quenching in air.

Next, the tool steel strips were soldered to the MMC substrate in accordance with the solder manufacturer's recommendations, a key feature of which consisted of a bonding jig consisting basically of a base that could be heated or cooled, a crosshead for applying a compressive load, and an ultrasonic transducer built into the crosshead for applying vibration. The surfaces to be bonded 53, 55, 57, 59 were roughened with the abrasive (e.g, a wire brush) supplied in the SuperBraze 250 kit (Materials Resources International, North Wales, Pa.), then these surfaces were cleaned with the cleaning agent supplied with the kit. A quantity of SuperBraze 250 soldering pellets was placed into a crucible. Specifically, the crucible and tool steel strips were placed onto a separate hotplate and heated to a temperature in the range of about 253° C. to about 274° C. Similarly, the MMC substrate was placed into the bonding jig, specifically on the base of the jig and with the V channel facing up toward the crosshead. The base was also heated to the above-mentioned temperature range.

When this temperature zone had been reached, some molten solder alloy was scooped out of the crucible and placed into the V channel of the MMC substrate. The dross was pushed away, and then the molten solder was smeared over all MMC surfaces to be bonded with a metal tool resembling a dentist's pick. The tool steel strips were than placed into the V channel on top of the molten solder. The crosshead of the press was then brought down into contact with the strips, and the contact was maintained under a pressure of about 5 to 10 psi. Then, the ultrasonic transducer was energized so as to supply ultrasonic vibration for about one to two seconds. The pressure was maintained while power to the base heater and transducer was interrupted, and water-cooling of the base was started. When the temperature of the soldered assembly had dropped to about 165° C., the pressure was removed and the soldered macrocomposite guideway was removed from the bonding jig.

Later, when the soldered joint had cooled to about ambient temperature, the macrocomposite guideway was finish machined to the final dimensions and surface finishes of the linear guideway upon which it was modeled.

EXAMPLE 2

A macrocomposite beam representative of a hybrid linear guideway was fatigue-tested to determine whether such a guideway might undergo permanent distortion from being subjected to cyclic loads imposed over prolonged periods.

Referring to FIG. 7, the technique of Example 1 was substantially repeated to solder an approximately 20 cm by 1.2 cm strip of 16 gage tool steel 32 to an MMC bar 34 measuring about 20 cm by about 2.5 cm by about 1.2 cm, thereby producing a macrocomposite beam. The solder joint was dye penetrant tested. The test was negative, indicating no debonded regions accessible to the surface of the beam.

A test rig was designed and fabricated to imitate the stresses associated with near linear contact of a loaded roller bearing. In particular, eight equally spaced, 6 mm diameter hardened steel pins 36 were held in place by rubber bands 38 within equally spaced notches 33 in a tool steel beam 35 that measured about 17 cm by about 2.5 cm by about 1.2 cm. The tool steel beam was then brought into contact with the macrocomposite beam, specifically with the hardened steel pins contacting the tool steel surface of the macrocomposite beam. The macrocomposite beam was strain gaged across the solder joint 31, with one gage 37 located directly under a steel pin, and the other 39 located midway between pins.

First, a static load was applied to the macrocomposite beam to measure the deflection under and between the pins. Specifically, a uniaxial, compressive load was applied to a slight depression 30 centered on the backside of the tool steel beam. Loads of 770 Newtons, 2300 N and 7670 N were applied in sequence. The 770 N load corresponded approximately to the anticipated load on an actual linear guideway in service.

Then, fatigue testing was performed. Using the same setup as for the static loads, a uniaxial compressive load cycling between about 770 N and 7670 N was applied to the macrocomposite beam at a frequency of about 50 Hz using a programmable Instron 8501 servo-hydraulic test frame (Instron Corporation, Canton, Mass.). After about 10 million cycles, the maximum beam deflection appeared to have increased by only about 0.06 micron. Dye penetrant testing showed no zones of debonding. An ultrasonic test, in particular, a "C-scan" showed several light spots, suggesting some kind of localized adverse phenomenon occurring beneath the surface of the beam.

Fatigue testing was then resumed for another 10 million load cycles at the 50 Hz frequency, this time with loads cycling between about 1990 N and 19,900 N (equivalent to the rated load of the bearings). Here, although the total beam deflection was greater because of the greater load, there was no change in maximum deflection as a result of the fatigue testing. Further, dye penetrant testing still showed no gaps in the bond zone. The ultrasonic C-scan, however, showed additional light spots, and visual inspection showed that some of the solder had been squeezed out of the bond region. Nevertheless, the macrocomposite beam survived cycling at this extreme loading without visible deterioration.

EXAMPLE 3

A compression test was devised to determine whether the adjusting setscrews would distort or otherwise mar the surface of the metal matrix composite substrate portion of the instant hybrid guideway. Specifically, and with reference to FIG. 8, about five setscrews 42 were threaded into a beam of tool steel 44 measuring about 25 cm by 1.2 cm by 1.5 cm. The beam was then placed in contact with a metal matrix composite beam 46 having a thickness of about 1 cm, and the setscrews were adjusted so that each contacted MMC material. A uniaxial force of about 1100 N was then applied to the tool steel beam for about one second, forcing the five setscrews against the MMC surface. This force left slight but visible, permanent indentations in the MMC surface. More specifically, the deformed zone took the shape of an incomplete circle, partially replicating the tips of the setscrews. Then, on an undisturbed region of the same MMC surface, a force cycling between 0 and about 1100 N was applied using the equipment described in Example 2. This loading was applied at a frequency of about 50 Hz for a total of about 5 million cycles. The indentation marks left by the setscrews on the MMC surface were no more severe than for the one-second application of this load one time. This result suggests that after the initial plastic deformation accommodates a newly imposed load applied to a limited contact area, no further deformation occurs upon cycling up to this load.

INDUSTRIAL APPLICABILITY

The instant inventors have fabricated a hybrid or macrocomposite gib that is about 50 percent lighter than the all-steel gib that it replaces. When fatigue tested for 10,000,000 cycles at the load limit of the bearings, the macrocomposite guideway component of the gib showed no visible deterioration, and had a permanent set of only about 0.06 micron. Thus, the hybrid guideways of the instant invention should function in the most demanding applications of load or contact stress. The instant gibs should find application in motion control stages such as those employed in CNC machining or metrology. The instant gibs should be particularly desirable in certain machines used in semiconductor fabrication, where the lighter the platform or stage holding the semiconductor can be made, the faster the platform can be moved around underneath the work area. One immediate use contemplated is in semiconductor chip wirebonding machines, but perhaps the instant gibs also may be of utility in lithography, particularly lithography that must be done under vacuum, where gas bearings cannot be used.

An artisan of ordinary skill will appreciate that numerous modifications can be made to the invention herein described without departing from the spirit or scope of the invention, as set forth in the claims appended hereto.

What is claimed is:

1. A stage for precise linear motion of a workpiece in at least one dimension, said stage comprising:
   at least one hardened steel linear guideway for physical contact with a bearing, said guideway comprising at least one flat surface having a thickness greater than about 100 microns and less than about 10 millimeters;

a chassis comprising a material having a bulk density no greater than about 6 g/cc, and having a specific stiffness at least 50 percent greater than that of said hardened steel linear guideway, said chassis furthermore comprising at least one land for receiving and supporting said guideway; and said guideway attached to said chassis at said land.

2. The stage of claim 1, wherein said material of said chassis comprises a metal matrix composite material.

3. The stage of claim 2, wherein said metal matrix composite material comprises silicon carbide distributed in a matrix comprising aluminum.

4. The stage of claim 1, wherein said guideway is attached to said chassis by at least one of soldering and brazing.

5. The stage of claim 1, wherein said material of said chassis has a bulk density no greater than about 5 g/cc, and said stage is for use in a semiconductor wirebonding apparatus.

6. The stage of claim 1 wherein said guideway is attached permanently to said chassis at said land.

7. The stage of claim 6 wherein said guideway is attached to said chassis at said land with a solder comprising tin, silver and titanium.

8. A macrocomposite gib, comprising:

at least two linear guideways arranged with respect to one another so as to define a bearing race, at least one of said linear guideways comprising a macrocomposite guideway comprising (i) a hardened steel surface element adjacent said bearing race, and (ii) a composite substrate permanently adhered to and supporting said hardened steel surface element, said substrate having a bulk density no greater than about 6 g/cc and a specific stiffness at least 50 percent greater than that of said hardened steel surface element; and at least one bearing element disposed in said bearing race.

9. A macrocomposite linear guideway, comprising:

a substrate body comprising a composite material;

a hardened steel body comprising at least one surface to be in physical contact with a bearing, and at least one surface other than said physical contact surface, said at least one other surface to be a bonding surface; and a bond attaching said hardened steel body to said substrate body at said bonding surface.

10. The linear guideway of claim 9, wherein said composite material comprises at least one metal in elemental or alloyed form selected from the group consisting of aluminum, beryllium, magnesium and silicon.

11. The linear guideway of claim 9, wherein said hardened steel body comprises tool steel.

12. The linear guideway of claim 9, wherein said bond is realized by means of a solder.

13. The linear guideway of claim 9, wherein said composite material comprises at least one material selected from the group consisting of a ceramic matrix composite and a metal matrix composite.

14. The linear guideway of claim 13, wherein said metal matrix composite material comprises a ceramic particulate reinforced aluminum.

15. The linear guideway of claim 14, wherein said ceramic particulate comprises at least one material selected from the group consisting of silicon carbide, boron carbide, aluminum oxide and aluminum nitride.

16. The linear guideway of claim 9, wherein said composite material comprises a network structure comprising silicon carbide, and a phase comprising elemental or alloyed silicon distributed throughout said network structure.

17. The linear guideway of claim 9 wherein said bond permanently attaches said hardened steel body to said substrate body at said bonding surface.

18. The linear guideway of claim 9 wherein said composite material has a specific stiffness at least 50 percent greater than that of said hardened steel body.

19. A guideway for a bearing, comprising: a hardened steel layer; and a substrate attached to said hardened steel layer, said substrate comprising a material having a bulk density no greater than about 60 percent that of said hardened steel layer, and said substrate further having a specific stiffness at least 50 percent greater than that of said hardened steel layer.

20. The guideway of claim 19, wherein said substrate comprises a composite material comprising at least one ceramic material.

21. The guideway of claim 19, wherein said substrate comprises beryllium.

22. The guideway of claim 19, wherein said substrate comprises an alloy comprising beryllium and aluminum.

23. The guideway of claim 19, wherein said substrate comprises at least one ceramic material selected from the group consisting of silicon carbide, boron carbide, aluminum nitride, silicon nitride, aluminum oxide and zirconium dioxide.

24. The guideway of claim 23, wherein said silicon carbide comprises reaction-formed silicon carbide.

25. The guideway of claim 19, wherein said hardened steel comprises tool steel.

26. The guideway of claim 19 wherein said steel layer comprises at least one surface intended to be in contact with a contact-type bearing, wherein said at least one surface defines a linear path for travel of said bearing, and wherein said substrate is permanently attached to said steel layer by an adhesive.

* * * * *